US008766966B2

(12) United States Patent
Kawashima

(10) Patent No.: US 8,766,966 B2
(45) Date of Patent: Jul. 1, 2014

(54) ORGANIC LIGHT EMITTING DISPLAY DEVICE AND DRIVING VOLTAGE SETTING METHOD THEREOF

(75) Inventor: Shingo Kawashima, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 678 days.

(21) Appl. No.: 12/637,647

(22) Filed: Dec. 14, 2009

(65) Prior Publication Data

US 2011/0025676 A1 Feb. 3, 2011

(30) Foreign Application Priority Data

Jul. 30, 2009 (KR) ........................ 10-2009-0069925

(51) Int. Cl.
*G06F 3/038* (2013.01)
*G09G 3/32* (2006.01)

(52) U.S. Cl.
USPC ............................................ 345/212; 345/82

(58) Field of Classification Search
USPC ................................ 345/82, 88, 90, 211, 212
See application file for complete search history.

(56) References Cited

U.S. PATENT DOCUMENTS

| | | | | |
|---|---|---|---|---|
| 7,053,558 | B2 * | 5/2006 | Hilbers et al. | 315/169.1 |
| 7,286,123 | B2 * | 10/2007 | Yang | 345/204 |
| 7,453,453 | B2 * | 11/2008 | Miyagawa et al. | 345/212 |
| 2002/0180721 | A1 | 12/2002 | Kimura et al. | |
| 2003/0080931 | A1 * | 5/2003 | Chen et al. | 345/88 |
| 2004/0135749 | A1 | 7/2004 | Kondakov et al. | |
| 2004/0263444 | A1 * | 12/2004 | Kimura | 345/82 |
| 2005/0225515 | A1 * | 10/2005 | Tsuchida et al. | 345/76 |
| 2008/0024528 | A1 * | 1/2008 | Han et al. | 345/690 |
| 2008/0284702 | A1 * | 11/2008 | Shidara et al. | 345/90 |
| 2009/0201281 | A1 | 8/2009 | Routley et al. | |

FOREIGN PATENT DOCUMENTS

| | | | |
|---|---|---|---|
| CN | 101263543 | A | 9/2008 |
| EP | 0 923 067 | | 6/1999 |
| JP | 2002-304156 | A | 10/2002 |
| JP | 2004-221083 | A | 8/2004 |
| JP | 2005-300929 | A | 10/2005 |
| JP | 2006-065148 | A | 3/2006 |
| JP | 2009-508171 | A | 2/2009 |
| KR | 10-2000-0010923 | A | 2/2000 |
| KR | 10-2008-0045192 | A | 5/2008 |
| KR | 1020080048876 | | 6/2008 |
| KR | 1020080060897 | | 7/2008 |
| KR | 10-2009-0080270 | A | 7/2009 |
| WO | WO 2007/031704 | | 3/2007 |

OTHER PUBLICATIONS

Korean Office Action dated Nov. 29, 2011 for Korean Patent Application No. KR 10-2009-0069925 which corresponds to captioned U.S. Appl. No. 12/637,647.

Japanese Office Action dated Jan. 4, 2012 for Japanese Patent Application No. JP 2009-236556 which shares priority of Korean Patent Application No. KR 10-2009-0069925 with captioned U.S. Appl. No. 12/637,647.

Chinese Office Action dated Jun. 28, 2012 for Chinese Patent Application No. CN 201010111412.4 which shares priority of Korean Patent Application No. KR 10-2009-0069925 with captioned U.S. Appl. No. 12/637,647.

European Office Action No. 10155924.3 dated Jul. 9, 2010.

Korean Office Action dated Jul. 30, 2012 for Korean Patent Application No. KR 10-2009-0069925 which corresponds to captioned U.S. Appl. No. 12/637,647.

* cited by examiner

*Primary Examiner* — Andrew Sasinowski

(74) *Attorney, Agent, or Firm* — Knobbe Martens Olson & Bear LLP

(57) ABSTRACT

An organic light emitting display device with reduce power consumption is disclosed. Some embodiments include a current detector which measures current over varying drive voltages. The current measurements are used to determine drive voltages for driving the display array.

18 Claims, 2 Drawing Sheets

ORGANIC LIGHT EMITTING DISPLAY DEVICE AND DRIVING VOLTAGE SETTING METHOD THEREOF

CROSS-REFERENCE TO RELATED APPLICATIONS

This application claims priority to and the benefit of Korean Patent Application No. 10-2009-0069925, filed on Jul. 30, 2009, in the Korean Intellectual Property Office, the entire content of which is incorporated herein by reference.

BACKGROUND

1. Field

The field relates to an organic light emitting display device and a method of setting a driving voltage thereof, and more particularly, to an organic light emitting display device and method resulting in reduced power.

2. Description of the Related Technology

Various flat panel display devices that have light weight and small volume when compared to a cathode ray tube have been developed. Among the flat panel display devices, an organic light emitting display device, which uses an organic compound as light emitting material, has various advantages in view of brightness and color purity so that it has been viewed as a next generation display device.

The organic light emitting display device as described above is coupled between supply lines of high power voltage and low power voltage and use organic light emitting diodes OLED emitting light of a brightness corresponding to data signals to display an image.

In order to allow the organic light emitting diodes to emit light uniformly during the emission periods of each frame, the voltage difference between the high power voltage and the low power voltage, that is, a driving voltage, should be sufficiently stable.

To this end, in the general organic light emitting display device, the driving voltage is set, having a voltage margin of about 30%, so that the sufficient driving voltage is determined based on the fluctuation in the driving voltage by the temperature characteristics of the organic light emitting diodes themselves and on the deviation in the driving voltage according to the emission colors.

However, the organic light emitting display device is typically operated according to an assumed condition. Therefore, the conventional voltage margin set by considering all conditions including even unnecessary conditions leads to unnecessary power consumption, thereby causing an unnecessary increase in power consumption.

SUMMARY OF CERTAIN INVENTIVE ASPECTS

One aspect is an organic light emitting display device. The device includes a display panel, and a power supplier configured to supply a driving voltage to the display panel, where the power supplier includes a variable circuit configured to vary the driving voltage. The device also includes a current detector configured to detect a panel current flowing into the display panel while the driving voltage is supplied from the power supplier to the display panel, where an optimal driving voltage is determined by calculating the variations of the panel current as a result of variations in the driving voltage.

Another aspect is a method of setting a driving voltage for an organic light emitting display device. The method includes supplying a varying driving voltage to a display panel, detecting a panel current flowing into the display panel while the driving voltage is supplied, calculating variations of the panel current resulting from the variations in the driving voltage, and determining an optimal driving voltage based on the variations of the panel current.

BRIEF DESCRIPTION OF THE DRAWINGS

The accompanying drawings, together with the written description illustrate exemplary embodiments.

DETAILED DESCRIPTION OF CERTAIN INVENTIVE EMBODIMENTS

Figure 1:
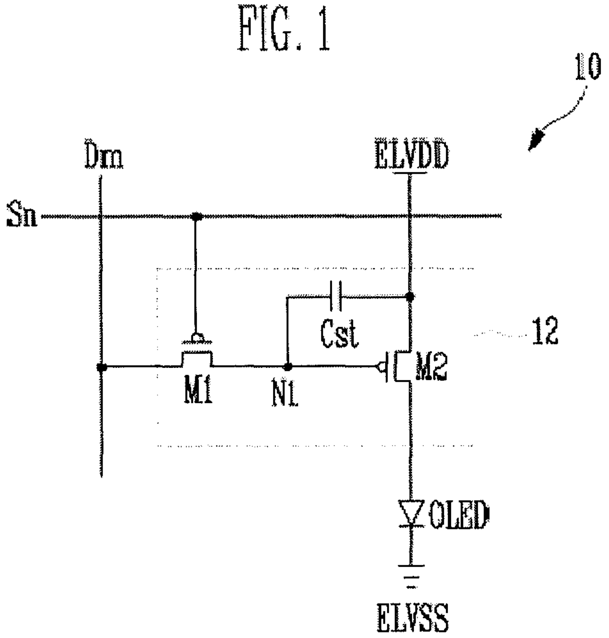
FIG. 1 is a circuit view showing one example of a pixel according to some embodiments.

Hereinafter, certain exemplary embodiments will be described with reference to the accompanying drawings. Herein, when a first element is described as being coupled to a second element, the first element may be directly coupled to the second element or may be indirectly coupled to the second element via a third element. Further, some of the elements that are not essential to the complete understanding of the invention are omitted for clarity. Also, like reference numerals generally refer to like elements throughout.

Hereinafter, exemplary embodiments will be described with reference to the accompanying drawings.

FIG. 1 is a circuit view showing one example of a pixel according to some embodiments. For convenience of explanation, a pixel of an active type organic light emitting display device having a simple structure will be exemplified in FIG. 1.

Referring to FIG. 1, the pixel 10 includes an organic light emitting diode OLED coupled between a supply line of first power voltage ELVDD and a supply line of second power supply ELVSS and a pixel circuit 12 that controls the organic light emitting diode OLED.

In this embodiment, the anode electrode of the organic light emitting diode OLED is coupled to the supply line of the first power supply ELVDD via the pixel circuit 12 and the cathode electrode thereof is coupled to the supply line of the second power supply ELVSS. Herein, the first power voltage ELVDD is a high power voltage and the second power voltage ELVSS is a low power voltage lower than the first power voltage ELVDD.

The organic light emitting diode OLED as described above emits light at a brightness corresponding to the driving current supplied from the pixel circuit 12.

The pixel circuit 12 includes a first transistor M1, a second transistor M2, and a capacitor C1.

The first transistor M1 is coupled between a data line Dm and a first node N1, wherein the gate electrode of the first transistor M1 is coupled to a scan line Sn. When a scan signal is supplied from the scan line Sn, the first transistor M1 is turned on to transfer the data signal from the data line Dm to the first node N1.

The second transistor M2 is coupled between the supply line of the first power voltage ELVDD and the organic light emitting diode OLED, wherein the gate electrode of the second transistor M2 is coupled to the first node N1. The second transistor M2 as described above supplies the driving current corresponding to the voltage Vgs between the source electrode and the gate electrode thereof to the organic light emitting diode OLED.

The capacitor Cst is coupled between the first node N1 and the supply line of the first power voltage ELVDD. In other words, the capacitor Cst is coupled between the source electrode and the gate electrode of the second transistor M2. When the scan signal is supplied from the scan line Sn, the capacitor Cst is charged with the voltage corresponding to the data signal at the first node N1 to store it for one frame.

When the scan signal is supplied from the scan line Sn, the first transistor M1 is turned on and the data signal is transferred to the first node N1 from the data line Dm. At this time, the capacitor Cst is charged with the voltage corresponding to the difference between the data signal and the first power voltage ELVDD to store it until the data signal of the next frame is supplied.

The second transistor M2 acts as a constant current source supplying current corresponding to the data signal to the organic light emitting diode OLED, according to the voltage Vgs between the gate electrode and the source electrode thereof as maintained by the capacitor Cst. Accordingly, the organic light emitting diode OLED emits light at the brightness corresponding to the data signal.

In order that the organic light emitting diode OLED uniformly emits light according to the data signal during the emission periods of the respective frames, the second transistor M2 is to be a stable constant current source during the emission period of each frame.

To this end, not only the voltage Vgs between the gate electrode and the source electrode of the second transistor M2 but also the voltage Vds between the source electrode and the drain electrode are to be stable. Therefore, the voltage difference between the high power voltage and the low power voltage, that is, the driving voltage, is to be stable from frame to frame while the panel is driven.

For a given Vgs, a driving voltage, or Vds can be selected for stable, power efficient operation. A driving voltage which is too low causes high dependence of the driving current on the Vds. That is, for a small change in Vds a large current change occurs. This results in undesired brightness variation. A driving voltage which is too high results in unnecessarily high power consumption. Therefore, some embodiments include a method to reduce power consumption by setting a driving voltage that results in low power driving current which is substantially independent of variation in Vds. The detailed description thereof will be described below.

Figure 2:
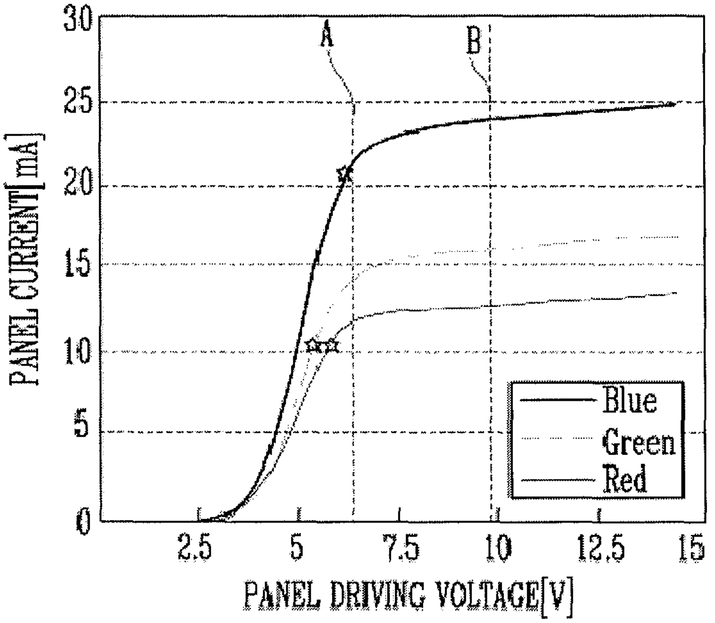
FIG. 2 is a graph showing a panel current according to a driving voltage of a panel.

FIG. 2 is a graph showing a panel current according to a driving voltage of a panel. In FIG. 2, the driving voltage of the panel is the voltage difference between the first power voltage ELVDD and the second power voltage ELVSS and the panel current represents the total amount of current flowing through the panel light emitting diodes.

Referring to FIG. 2, for low driving voltages, as the driving voltage of the panel is increased, the amount of current flowing on the panel is also increased. However, in the voltage region greater than a certain driving voltage, the current is substantially constant.

An optimal driving voltage can reduce unnecessary voltage margin, while securing substantially constant current of the driving transistor. In some embodiments, an optimal driving voltage may be selected as the voltage at which the slope of the current vs. driving voltage curve is less than a threshold. The optimal driving voltage may be used as the driving voltage that drives the organic light emitting display device.

In some embodiments, an optimal driving voltage may be obtained by detecting the driving voltage at the current at a turning point where the derivatives of the panel current according to the driving voltage is changed.

In some embodiments, the optimal driving voltage for each of the respective emission colors is different. In such embodiments, the highest of the optimal driving voltages may be selected as a single optimal driving voltage for all colors.

In FIG. 2, the points marked with stars are the points where the respective emission colors emit light at desired brightness (for example, brightness of 350 cd/$m^2$), the driving voltage at A may be selected as the optimal driving voltage. In this case, the unnecessary power consumption due to the unnecessary voltage margin of approximately 30% of the driving voltage at B is not necessary.

As a result, low voltage can be used for low power, while still achieving substantially constant current. Beneficially, the value of A may be determined while operating the display. The detailed description thereof will be described later with reference to FIGS. 3 and 4.

Figure 3:
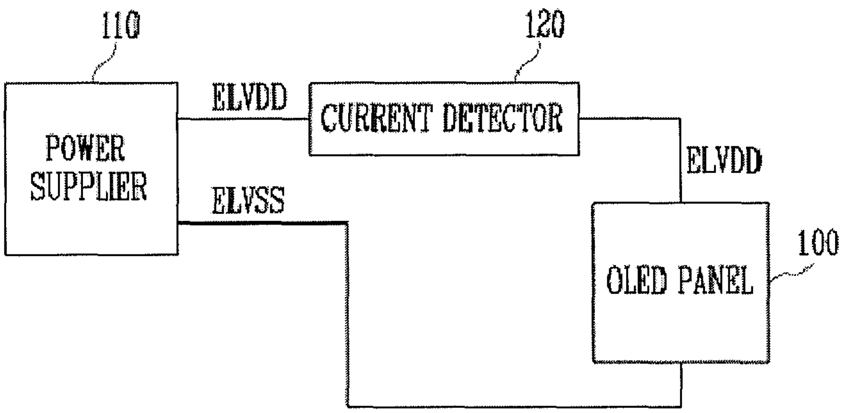
FIG. 3 is a block diagram showing an organic light emitting display device according to some embodiments.
Figure 4:
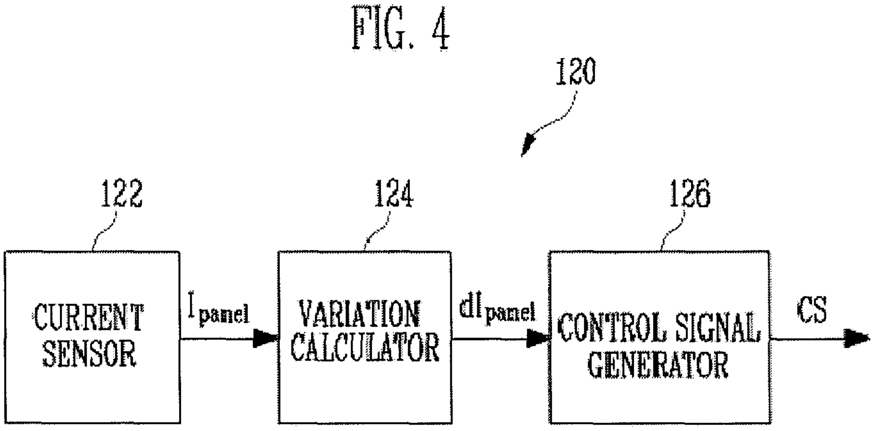
FIG. 4 is a block diagram showing an example of the current detector of FIG. 3.

FIG. 3 is a block diagram showing an organic light emitting display device according to some embodiments, and FIG. 4 is a block diagram showing an example of the current detector of FIG. 3.

Referring to FIG. 3, the organic light emitting display device includes a display panel 100 that display an image, a power supplier 110 that supplies a driving voltage to the display panel 100, and a current detector 120 that detects a panel current flowing into the display panel 100 according to the driving voltage.

The display panel 100 may be implemented as an active type organic light emitting display panel that includes pixels as shown in FIG. 1 or active type pixels having a pixel structure that is variously modified, or a passive type organic light emitting display panel that does not include active elements in the pixel. Also, the display panel 100 may further include a driving circuit such as a scan driver and/or a data driver, etc., according to the design scheme thereof.

The display panel 100 as described above is turned on by the driving voltage supplied from the power supplier 110, to display an image corresponding to a data signal.

The power supplier 110 supplies the driving voltage to the display panel 100. More specifically, the power supplier 110 outputs a first power voltage ELVDD to a positive output terminal and outputs a second power voltage ELVSS to a negative output terminal. Accordingly, the display panel 100 is driven by the driving voltage, which is the voltage difference between the first power voltage ELVDD and the second power voltage ELVSS.

In some embodiments, the power supplier 110 includes a variable circuit (not shown) that varies the driving voltage so that the optimal driving voltage is used. For example, the power supplier 110 may include a variable circuit that varies the driving voltage by varying the first power voltage ELVDD.

The current detector 120 detects a panel current flowing into the display panel 100 while the driving voltage is supplied from the power supplier 110 to the display panel 100. For example, the current detector 120 is positioned on the first power supply line that transfers the first power voltage ELVDD from the power supplier 110 to the display panel 100 to measure the current flowing in the first power supply line, thereby making it possible to detect the panel current flowing into the display panel 100.

The current detector 120 calculates the variations of the panel current according to the driving voltage, thereby allowing the optimal driving voltage as shown in the time point A in FIG. 2 to be selected.

As shown in FIG. 4, the current detector 120 may include a current sensor 122 that detects the panel current Ipanel flowing to the display panel and a variation calculator 124 that calculates the variations of the panel current. Also, the current detector 120 may further include a control signal generator 126 that controls the power supplier 110 based on the variations dIpanel of the panel current calculated by the variation calculator 124.

Accordingly, the current sensor 122 detects the panel current Ipanel flowing to the display panel while the driving voltage is supplied to the display panel 100. A signal based on the panel current Ipanel detected from the current sensor 122 is input to the variation calculator 124.

The variation calculator 124 calculates the variations of the panel current according to the driving voltage. The derivatives of the panel current may be calculated. Accordingly, the variation calculator 124 may output the derivative of the panel current according to the driving voltage and may, for example, be an analog differentiator. The information on the variations of the panel current calculated from the variation calculator 124 is input into the control signal generator 126.

The control signal generator 126 generates a control signal CS that controls the power supplier 110 according to the variations of the panel current. For example, the control signal generator 126 may generate a control signal so that the power supplier 110 generates a driving voltage substantially equal to the lowest driving voltage where the derivative of the panel current according to the driving voltage is less than a threshold.

In some embodiments, the control signal generator 126 is included in the current detector 120, but the control signal generator 126 may be separate from the current detector 120 or may also be in an output voltage setting block in the power supplier 110.

The organic light emitting display device according to some embodiments varies the driving voltage output into the display panel 100 from the power supplier 110 to detect the panel current Ipanel flowing into the display panel 100 and to calculate the variations of the panel current according to the driving voltage, in order to set an optimal driving voltage.

A method of setting a driving voltage for an organic light emitting display device according to some embodiments includes varying a driving voltage in a power supplier 110 and supplying it to a display panel 100, detecting a panel current Ipanel flowing into the display panel 100 during a period when the driving voltage is varied and supplied, and calculating the variations of the panel current according to the driving voltage and setting an optimal driving voltage based on the variations.

An optimal driving voltage may be set as the driving voltage at the point where the driving voltage at a turning point where the derivatives of the panel current according to the driving voltage is changed. (e.g. the driving voltage at the point where the derivative of the panel current is reduced as the driving voltage is increased).

In some embodiments, the display panel 100 displays an image while the current and driving voltage data is taken.

In some embodiments, the display panel 100 displays an image of maximum luminance while the current and driving voltage data is taken. However, the embodiment is not limited thereto. The data can be taken while a still screen is displayed. The display panel does not always set the optimal driving voltage while displaying a full-white screen. For example, after detecting the optimal driving voltage for each emission color, the driving voltage to drive the organic light emitting display device may be finally determined based thereon. Also, in the case of the passive type organic light emitting display device, after detecting the optimal driving voltage for each emission color, the driving voltage optimized for each emission color may be applied at the time of driving.

Moreover, if the optimal driving voltage is set in the manner as described above under a condition matching the environment where the organic light emitting display device is to be driven, the constant current may be flowed to the panel during the light emitting period of the respective frames, while preventing the voltage margin from being set in consideration of all of unnecessary conditions. Therefore, the unnecessary voltage margin is minimized, making it possible to reduce the power consumption.

In addition, in some embodiments, the display sets the optimal driving voltage in consideration of the environment to be driven before it comes to the market or it can also be variously designed so that the optimal driving voltage is changed and set according to the change in the environment during the use thereof.

While the present invention has been described in connection with certain exemplary embodiments, it is to be understood that the invention is not limited to the disclosed embodiments, but, on the contrary, is intended to cover various modifications and equivalent arrangements.

What is claimed is:

1. An organic light emitting display device, comprising:
a display panel;
a power supplier configured to supply a driving voltage to the display panel, wherein the power supplier comprises a variable circuit configured to vary the driving voltage; and
a current detector configured to detect a panel current flowing into the display panel while the driving voltage is supplied from the power supplier to the display panel,
wherein an optimal driving voltage is determined by determining a relationship between the driving voltage and the slope of a curve representing the panel current as a function of the driving voltage, and determining the lowest driving voltage which corresponds to the slope which is below a threshold, and
wherein the optimal driving voltage is a driving voltage at a turning point where the derivative of the panel current decreases with respect to an increase in the driving voltage.

2. The organic light emitting display device as claimed in claim 1, wherein the optimal driving voltage is a driving voltage at a point where the derivative of the panel current with respect to the increase in the driving voltage is reduced below a threshold.

3. The organic light emitting display device as claimed in claim 1, wherein the power supplier is configured to output a first power voltage to a positive output terminal and a second power voltage to a negative output terminal, and the driving voltage is a voltage difference between the first power voltage and the second power voltage.

4. The organic light emitting display device as claimed in claim 3, wherein the first power voltage is a high power voltage and the second power voltage is a low power voltage.

5. The organic light emitting display device as claimed in claim 3, wherein the power supplier is configured to vary the driving voltage by varying the first power voltage.

6. The organic light emitting display device as claimed in claim 3, wherein the current detector is connected to a first power supply line that transfers the first power voltage from the power supplier to the display panel and is configured to detect the panel current flowing in the first power supply line.

7. The organic light emitting display device as claimed in claim 1, wherein the current detector includes:

a current sensor that detects the panel current; and a variation calculator that calculates the variations of the panel current.

8. The organic light emitting display device as claimed in claim 7, wherein the variation calculator outputs the derivative of the panel current with respect to the driving voltage.

9. The organic light emitting display device as claimed in claim 7, wherein the variation calculator comprises an analog differentiator that outputs the derivative of the panel current with respect to the driving voltage.

10. The organic light emitting display device as claimed in claim 7, wherein the current detector further includes a control signal generator that generates a control signal for controlling the power supplier according to the variations of the panel current.

11. The organic light emitting display device as claimed in claim 1, wherein the display panel displays a still image while data for calculating the variations of the panel current is taken.

12. The organic light emitting display device as claimed in claim 1, wherein the display panel is supplied with the data corresponding to the maximum gray scale while data for calculating the variations of the panel current is taken.

13. The organic light emitting display device as claimed in claim 1, wherein the optimal driving voltage is determined by selecting the greatest of multiple driving voltages, each of the multiple driving voltages being determined as an optimal driving voltage for one of multiple display colors.

14. A method of setting a driving voltage for an organic light emitting display device, the method comprising:

supplying a varying driving voltage to a display panel;

detecting a panel current flowing into the display panel while the driving voltage is supplied;

calculating a relationship between the driving voltage and the slope of a curve representing the panel current as a function of the driving voltage; and determining an optimal driving voltage based on the calculated slope, wherein the optimal driving voltage is the lowest driving voltage which corresponds to the slope which is below a threshold, wherein the optimal driving voltage is determined as a driving voltage at a turning point where the derivative of the panel current decreases with respect to an increase in the driving voltage.

15. The method as claimed in claim 14, wherein the optimal driving voltage is determined as a driving voltage at a point where the derivative of the panel current with respect to the driving voltage is reduced below a threshold.

16. The method as claimed in claim 14, wherein the display panel displays a still image while data for calculating the variations of the panel current is taken.

17. The method as claimed in claim 14, wherein the display panel is supplied with the data corresponding to the maximum gray scale while data for calculating the variations of the panel current is taken.

18. The method as claimed in claim 14, wherein the optimal driving voltage is determined by selecting the greatest of multiple driving voltages, each of the multiple driving voltages being determined as an optimal driving voltage for one of multiple display colors.

* * * * *